United States Patent
Kamioka et al.

(10) Patent No.: US 9,688,285 B2
(45) Date of Patent: Jun. 27, 2017

(54) VEHICLE TRAVEL DEVICE AND VEHICLE TRAVEL CONTROL METHOD

(71) Applicant: Mitsubishi Electric Corporation, Tokyo (JP)

(72) Inventors: Nozomu Kamioka, Tokyo (JP); Noriya Sagayama, Tokyo (JP); Satoshi Wachi, Tokyo (JP); Toshiaki Date, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/888,891

(22) PCT Filed: Sep. 2, 2013

(86) PCT No.: PCT/JP2013/073518
§ 371 (c)(1),
(2) Date: Nov. 3, 2015

(87) PCT Pub. No.: WO2015/029246
PCT Pub. Date: Mar. 5, 2015

(65) Prior Publication Data
US 2016/0082977 A1 Mar. 24, 2016

(51) Int. Cl.
*B60W 50/08* (2012.01)
*B60W 10/04* (2006.01)
(Continued)

(52) U.S. Cl.
CPC ........... *B60W 50/087* (2013.01); *B60T 8/175* (2013.01); *B60W 10/04* (2013.01);
(Continued)

(58) Field of Classification Search
None
See application file for complete search history.

(56) References Cited

U.S. PATENT DOCUMENTS 4,596,221 A * 6/1986 Ament ............... F02D 41/0052
123/501
4,649,886 A * 3/1987 Igashira ............. F02D 41/2096
123/357
(Continued)

FOREIGN PATENT DOCUMENTS

JP 6-206531 A 7/1994
JP 2003-083130 A 3/2003
(Continued)

OTHER PUBLICATIONS

International Search Report of PCT/JP2013/073518 dated Dec. 3, 2013.
(Continued)

*Primary Examiner* — Russell Frejd
(74) *Attorney, Agent, or Firm* — Sughrue Mion, PLLC; Richard C. Turner

(57) ABSTRACT

A travel control device (1) provided to a vehicle travel device (100) performs correction calculation of the rate of change of a requested acceleration using a relatively small value when the rate of change of the requested acceleration obtained from an angle sensor (2) is small, and performs correction calculation of the rate of change of the requested acceleration using a relatively large value when the rate of change of the requested acceleration obtained from the angle sensor (2) is large.

8 Claims, 5 Drawing Sheets

(51) Int. Cl.
    *B60W 30/18* (2012.01)
    *B60W 10/184* (2012.01)
    *B60T 8/175* (2006.01)

(52) U.S. Cl.
    CPC .... *B60W 10/184* (2013.01); *B60W 30/18109* (2013.01); *B60W 2510/18* (2013.01); *B60W 2540/10* (2013.01); *B60W 2540/12* (2013.01); *B60W 2720/125* (2013.01)

(56) References Cited

U.S. PATENT DOCUMENTS

| | | | |
|---|---|---|---|
| 5,375,917 A | 12/1994 | Inagaki et al. | |
| 5,730,680 A * | 3/1998 | Toukura | F16H 61/66254 477/45 |
| 6,672,687 B2 * | 1/2004 | Nishio | B60T 7/12 303/113.4 |
| 6,863,355 B2 * | 3/2005 | Nishio | B60T 8/1755 303/113.3 |
| 6,957,874 B2 * | 10/2005 | Hara | B60L 3/108 180/165 |
| 7,548,810 B2 * | 6/2009 | Aoki | F16H 61/66259 477/34 |
| 7,635,318 B2 * | 12/2009 | Kitaori | F16H 61/0213 477/115 |
| 8,494,731 B2 * | 7/2013 | Anderson | F16H 61/462 180/338 |
| 2002/0152015 A1 * | 10/2002 | Seto | B60K 31/0008 701/96 |
| 2004/0234825 A1 * | 11/2004 | Numao | B60L 11/1887 429/9 |

FOREIGN PATENT DOCUMENTS

| | | |
|---|---|---|
| JP | 2007-239607 A | 9/2007 |
| JP | 2012-144059 A | 8/2012 |

OTHER PUBLICATIONS

Communication, dated May 31, 2016, from the Japanese Patent Office in counterpart Japanese application No. 2015-533913, pp. 1-5.

\* cited by examiner

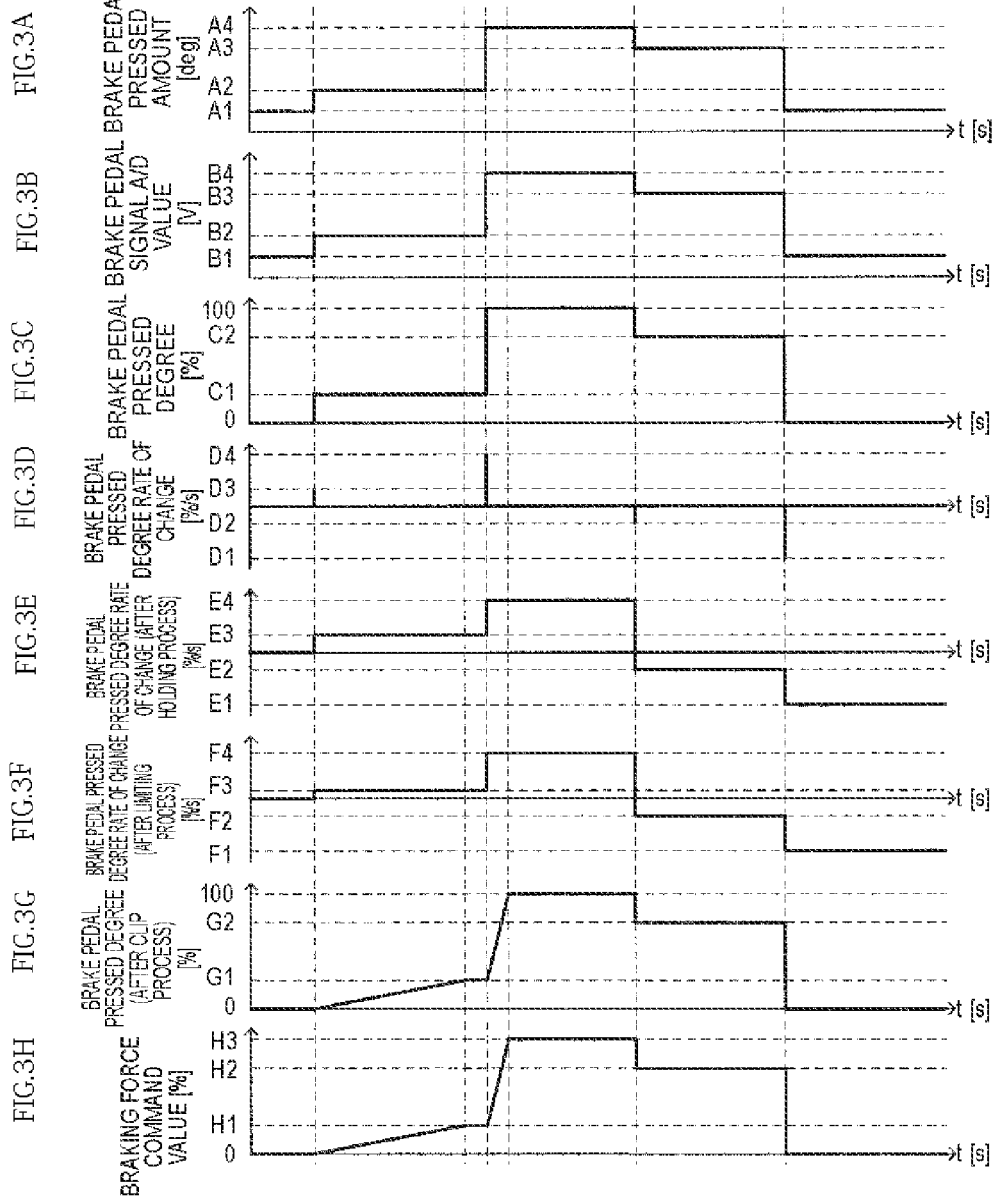

FIG.5

| [INPUT]<br>BRAKE PEDAL PRESSED DEGREE<br>RATE OF CHANGE<br>(AFTER HOLDING PROCESS) [%/s] | [OUTPUT]<br>BRAKE PEDAL PRESSED DEGREE<br>RATE OF CHANGE<br>(AFTER LIMITING PROCESS) [%/s] |
|---|---|
| 0.0 | 0.01 |
| 10.0 | 5.0 |
| 20.0 | 10.0 |
| 30.0 | 20.0 |
| 40.0 | 40.0 |
| 50.0 | 60.0 |
| 60.0 | 80.0 |
| 70.0 | 100.0 |
| 80.0 | 100.0 |
| 90.0 | 100.0 |
| 100.0 | 100.0 |

VEHICLE TRAVEL DEVICE AND VEHICLE TRAVEL CONTROL METHOD

This is a National Stage of Application No. PCT/JP2013/073518 filed Sep. 2, 2013, the contents of all of which are incorporated herein by reference in their entirety.

TECHNICAL FIELD

The present invention relates to a vehicle travel device and a vehicle travel control method with which a driving force or braking force can be applied to a vehicle according to a request from a driver.

BACKGROUND ART

A by-wire type device in which a driver-requested driving or braking force is detected by the pressed amount of a stroke sensor mounted on a foot pedal, then an actuator is controlled to provide a driving or braking force corresponding to the detected driver-requested acceleration has been proposed, for example, in JP-A-06-206531 (PTL 1). Note that the detail of the control is described later.

By the way, a typical foot pedal of currently mass-produced vehicles has a length from the pedal pressing position to the fulcrum of several tens of centimeters and a maximum pedal pressed amount of several centimeters or so. Consequently, the stroke amount from the pedal releasing position to the maximum pressed position (hereinafter referred to as a full stroke) converted in angle has been proved to be only a few degrees through an experiment performed by the inventors. In order to accurately control the driving or braking force according to the driver's request, the very small change in the angle described above needs to be accurately detected, which requires a higher-precision sensor, causing a problem of increasing the size and cost of the sensor.

Now, the operation of a foot pedal and an actuator that are not by-wire type is described. Supposing that the foot pedal is a brake pedal and the actuator is a brake, the braking force to be applied is expected to be proportional to the pressed amount of the foot pedal pressed by the driver. Similarly, when the foot pedal is an accelerator pedal and the actuator is an engine output, the driving force is expected to be proportional to the pressed amount. This operation should be consistent, independent of whether the above-described by-wire type system is employed or not. If this operation is inconsistent, the driver feels uncomfortable, which causes the commercial value of the vehicle to be reduced.

So, in order to provide a by-wire type system with a low-cost configuration, the inventors experimented a system in which a low-precision angle sensor is used as a brake stroke sensor to apply braking to a vehicle according to the detected driver-requested braking force. As a result, a problem occurred in which the system responds sensitively to a small braking operation due to its coarse detection precision, so the system recognizes the amount of change in the driver-requested braking force more sensitively than the driver recognizes, which causes the driver to feel uncomfortable.

In other words, even when the driver-requested braking force detected by a stroke sensor changes rapidly, if the amount of change is small, that rapid change is due to low detection precision of the brake stroke sensor, so the system is expected to determine that the driver has requested a slow increase in the braking force rather than a rapid braking; and if the amount of change is large, the system is expected to determine that the driver has requested a rapid braking and to rapidly increase the braking force. However, the problem was that this operation cannot be achieved with the low-precision brake stroke sensor.

This problem occurs when the low-precision angle sensor is used to control the actuator in order to provide a by-wire type system with a low-cost configuration. Needless to say, this problem applies to not only the brake pedal, but also the accelerator pedal.

Here, the PTL 1 discloses a technique including a function in which if determined that the operation speed per unit time of a brake pedal is higher than or equal to a predetermined value, it is determined that a rapid braking is requested, then the relationship between the amount of operation detected by an operation amount detection means and the amount of actuation control of an actuator is changed based on the determination result.

CITATION LIST

Patent Literature

PTL 1: JP-A-06-206531

SUMMARY OF INVENTION

Technical Problem

However, with a low-precision brake stroke sensor applied to the related art disclosed in the PTL 1, even when the amount of change in the driver-requested braking force is small, the amount of change per unit time will be relatively large due to the precision, so slow brake operation and rapid brake operation are indistinguishable from each other, and it cannot be determined whether the driver is requesting a rapid braking or not, which cannot solve the problem. Also, the related art disclosed in the PTL 1 is configured to only determine whether the slow or rapid brake operation is requested, which also causes a problem of discontinuous operation in a gray zone in which the determination is uncertain.

Furthermore, as a common technique for interpolating the output signal of the low-precision sensor, the application of a first-order lag filter to the output value of the stroke sensor is known, in which, when a signal changes in a step-like pattern, the filtered value also changes abruptly, so this technique also cannot solve the problem.

In order to solve the above problem, it is an object of the present invention to provide a vehicle travel device and a vehicle travel control method that can apply a driving or braking force according to a driver's request to a vehicle so that, even when a low-precision angle sensor is used as a means for detecting the driver's request using a foot pedal, a rapid acceleration or deceleration against the driver's intention will not be detected, and the driving or braking force is not discontinuous around the transition between slow operation and rapid operation.

Solution to Problem

A vehicle travel device in accordance with the invention includes: a motor; a tire that rotates by the power from the motor; a braking device that can decrease the rotation speed of the tire (4); a sensor for detecting an acceleration requested by a driver; and a travel control device that transmits/receives a signal to/from the braking device and to/from the sensor and controls the motor or the braking device, wherein, when the rate of change of a requested acceleration obtained from the sensor is less than a predetermined amount, the travel control device performs correction calculation of the rate of change of the requested acceleration with a value less than a predetermined set value; and when the rate of change of the requested acceleration obtained from the sensor is more than or equal to the predetermined amount, the travel control device performs correction calculation of the rate of change of the requested acceleration with a value more than or equal to the set value.

Advantageous Effects of Invention

According to the vehicle travel device in accordance with the invention, when the rate of change of a requested acceleration obtained from the sensor is less than a predetermined amount, the travel control device provided to the vehicle travel device performs correction calculation of the rate of change of the requested acceleration with a value less than a predetermined set value; and when the rate of change of the requested acceleration obtained from the sensor is more than or equal to the predetermined amount, the travel control device performs correction calculation of the rate of change of the requested acceleration with a value more than or equal to the set value, so, the vehicle travel device can apply a driving or braking force according to a driver's request to a vehicle so that, even when a low-precision angle sensor is used as a means for detecting the driver's request using a foot pedal, a rapid acceleration or deceleration against the driver's intention will not be detected, and the driving or braking force is not discontinuous around the transition between slow operation and rapid operation.

BRIEF DESCRIPTION OF DRAWINGS

FIGS. 3A through 3H are timing charts showing an operation over time of the vehicle travel device in accordance with the first embodiment of the invention.

FIG. 5 is a diagram showing specific values of FIG. 4C.

DESCRIPTION OF EMBODIMENTS

Figure 1:
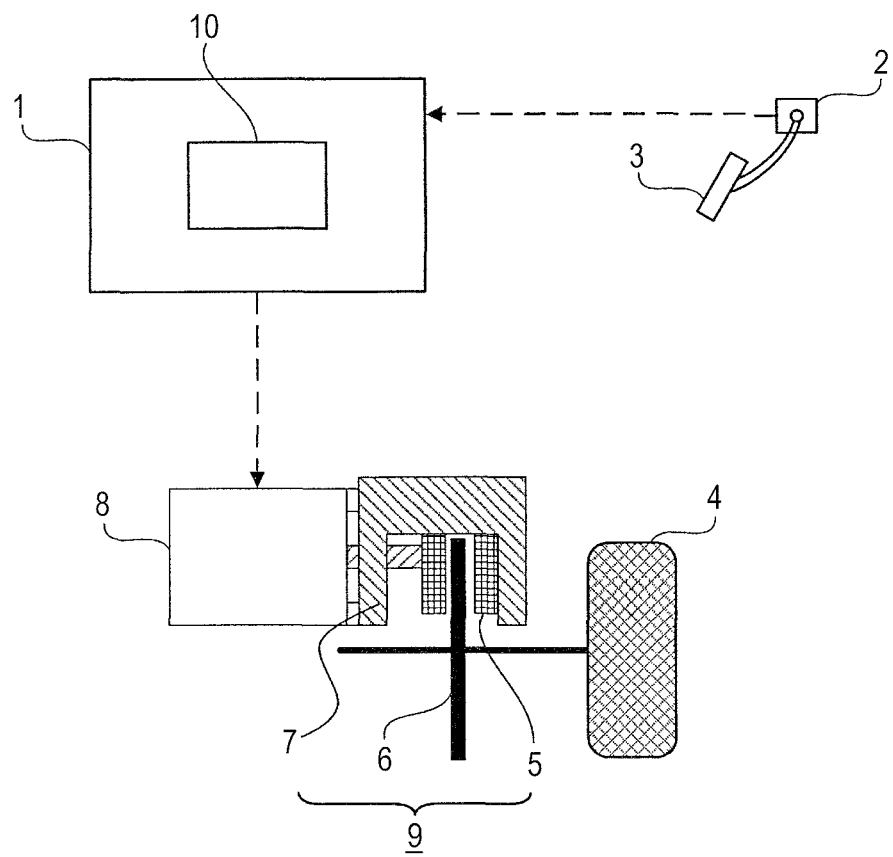
FIG. 1 is a configuration diagram showing a vehicle travel device in accordance with a first embodiment of the invention.

A suitable embodiment of a vehicle travel device and a vehicle travel control method in accordance with the invention is described below with reference to the drawings. Note that, through the drawings, the same or corresponding components are denoted by the same reference numerals.
First Embodiment FIG. 1 is a configuration diagram showing a vehicle travel device in accordance with a first embodiment of the invention. In FIG. 1, a travel device 100 includes a travel control device 1, an angle sensor 2, a brake pedal 3, a tire 4, a brake pad 5, a brake disc 6, a brake caliper 7 and a motor 8. Note that the brake pad 5, the brake disc 6 and the brake caliper 7 are included in a braking device 9.

The angle sensor 2 is mounted on the fulcrum of the brake pedal 3 and detects an angle that changes depending on the pressing of the brake pedal 3. The brake pedal 3 is attached to the floor of a driver's seat side and configured to be pressed by the foot of a driver, so the variable angle range is very narrow. The angle information of the angle sensor 2 is sent as a voltage to the travel control device 1. Since the angle sensor 2 is a low-precision and low-cost sensor, the output voltage from the angle sensor 2 has a non-linear characteristic such that the output voltage increases by a predetermined increment each time the angle increases by a predetermined increment from a reference angle. Note that the characteristic is described in detail later with reference to FIGS. 4A through 4D.

The travel control device 1 includes a calculation unit 10, therein, that calculates a driver-requested braking force based on the angle signal from the angle sensor 2 and outputs a command for the motor 8 to provide a braking force requested by the driver. The motor 8 includes a gear, therein, that converts rotational motion of the shaft to linear motion. When a command is output to the motor 8, the commanded motor 8 starts rotation and rotates to press the brake pad 5 against the brake disc 6 to a position for providing the braking force requested by the driver. The brake pad 5 is contained in the brake caliper 7. The brake caliper 7 is coupled and secured to a body and the motor 8. A braking force is generated by pressing the brake pad 5 against the brake disc 6. Since the brake disc 6 and the tire 4 are on the same power transmission path, a braking torque generated on the brake disc 6 decreases the rotation speed of the tire 4.

Note that all electric components are powered by a battery not shown. The tire 4 is caused to rotate by a motor not shown.

Figure 2:
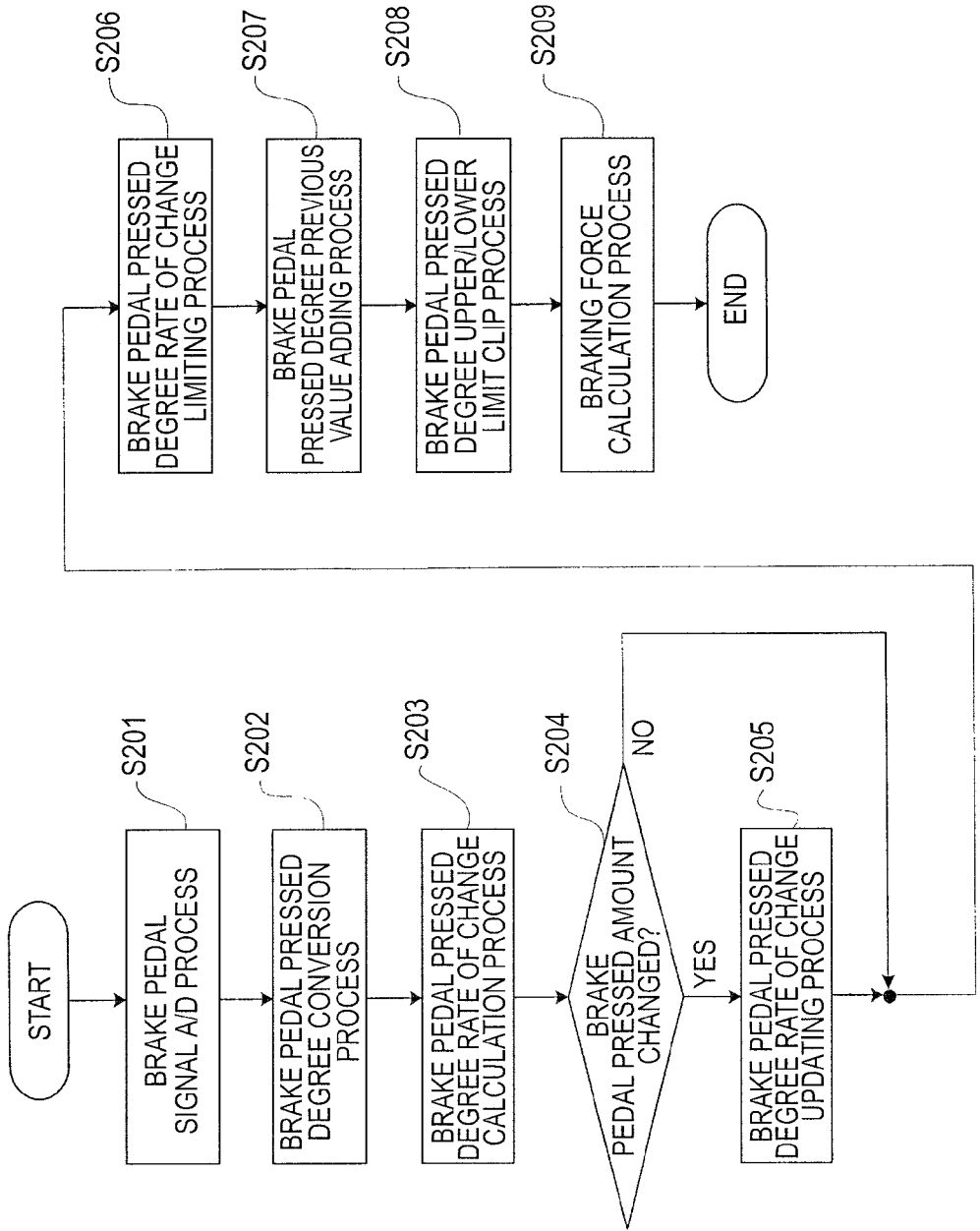
FIG. 2 is a flowchart showing a control flow of the vehicle travel device in accordance with the first embodiment of the invention.

The travel device 100 in accordance with the first embodiment is configured as above. Then, the travel control subroutine of the calculation unit 10 of the travel control device 1 is described with reference to a flowchart in FIG. 2. Here, the process shown in FIG. 2 is performed by the calculation unit 10 unless otherwise specified.

First, in step S201, an angle sensor output voltage value output from the angle sensor 2 according to an actual pressed amount of the brake pedal 3 is A/D converted and digitized into a brake pedal signal A/D value. Then, the subroutine proceeds to step S202.

In step S202, based on the characteristic of FIG. 4B described later, the brake pedal signal A/D value is converted to a brake pedal pressed degree according to the conversion characteristic. Then, the subroutine proceeds to step S203.

In step S203, based on the conversion expression shown by Expression (1) below, the brake pedal pressed degree is converted to a brake pedal pressed degree rate of change. Then, the subroutine proceeds to step S204.

$$\text{Brake pedal pressed degree rate of change} = \text{Brake pedal pressed degree (Previous value)} - \text{Brake pedal pressed degree (Current value)} \quad \text{Expression (1)}$$

In step S204, if the condition expression shown by Expression (2) below holds, it is determined that a change has occurred in the brake pedal pressed degree rate of change, then the subroutine proceeds to step 205; otherwise the subroutine proceeds to step 206.

$$\text{Brake pedal pressed degree rate of change} \neq 0 \quad \text{Expression (2)}$$

In step S205, based on the calculation expression shown by Expression (3) below, the brake pedal pressed degree rate of change (after holding process) is calculated. After the calculation, the subroutine proceeds to step S206. Note that the brake pedal pressed degree rate of change (after holding process) means a process of updating the value of the brake pedal pressed degree rate of change only when a change occurs in the brake pedal pressed degree rate of change. That is, in the calculation unit, the brake pedal pressed degree rate of change has a value only for one to a few calculation cycles in which the brake pedal pressed degree has changed. In this calculation, the limitation of the rate of change is performed by accumulating the brake pedal pressed degree rate of change that is limited to a brake pedal pressed degree at the time of the last change of the brake pedal pressed degree, which means that, when the rate of change has no value, the brake pedal pressed degree does not change. Due to this, the limiting process operation will not be as expected. Thus, even when the brake pedal pressed degree rate of change has no value, the brake pedal pressed degree rate of change is held so that the calculation of the brake pedal pressed degree rate of change is continuously performed.

Brake pedal pressed degree rate of change (after holding process)=Brake pedal pressed degree rate of change     Expression (3)

In step S206, based on the characteristic of FIG. 4C described later, the brake pedal pressed degree rate of change (after limiting process) is calculated from the brake pedal pressed degree rate of change (after holding process). Then, the subroutine proceeds to step S207. Note that the brake pedal pressed degree rate of change (after limiting process) means a process of calculating the brake pedal pressed degree rate of change limited based on the characteristic of FIG. 4C that is the limiting characteristic of the rate of change, from the last updated brake pedal pressed degree rate of change. In other words, this means a process for limiting the brake pedal pressed degree rate of change, which finally accumulates the brake pedal pressed degree rate of change to the brake pedal pressed degree, so the brake pedal pressed degree rate of change is limited by being subject to the limiting characteristic.

In step S207, based on the operational expression shown by Expression (4) below, the brake pedal pressed degree (after adding) is calculated. After the calculation, the subroutine proceeds to step S208. Here, a limitation depending on the rate of change is applied to create a behavior of insensitively responding to a small change of the brake pedal 3.

Brake pedal pressed degree (after adding) (Current value)=Brake pedal pressed degree (after clip process) (Previous value)+Brake pedal pressed degree rate of change (after limiting process)     Expression (4)

Note that the brake pedal pressed degree (after clip process) means a process of limiting the brake pedal pressed degree to prevent the range of the brake pedal pressed degree from departing from the range of 0-100% and exceeding the value of the current brake pedal pressed degree. That is, the calculated value of the brake pedal pressed degree is obtained by accumulating the brake pedal pressed degree rate of change to the brake pedal pressed degree as described above, which prevents the brake pedal pressed degree from departing the 0-100% range that is a limit value of the braking characteristic and causing braking beyond the current brake pedal pressed degree. Furthermore, when the brake pedal is relaxed rather than pressed the current brake pedal pressed degree decreases, so the braking is caused to responsively follow the brake pedal pressed degree free from the rate of change limitation.

In step S208, based on the calculation expression shown by Expression (5) below, the brake pedal pressed degree (after clip process) (Current value) is calculated. After the calculation, the subroutine proceeds to step S209.

Brake pedal pressed degree (after clip process) (Current value)=Max {MIN(Brake pedal pressed degree (after adding) (Current value), Brake pedal pressed degree, 100), 0}     Expression (5)

Where MAX is an operator that selects the maximum value from within the parentheses, and MIN is an operator that selects the minimum value from within the parentheses.

In step S209, based on the characteristic of FIG. 4D described later, the braking force command value is calculated from the brake pedal pressed degree (after clip process). After the calculation, a braking force command value calculated for the motor 8 is issued and then the subroutine ends.

Next, a processing result of the vehicle travel control of the calculation unit 10 of the travel control device 1 is described with reference to a timing chart in FIGS. 3A through 3H.

In FIGS. 3A through 3H, the horizontal axis indicates time. On the other hand, the vertical axis of FIGS. 3A through 3H indicates, from the top, brake pedal pressed amount, brake pedal signal A/D value, brake pedal pressed degree, brake pedal pressed degree rate of change, brake pedal pressed degree rate of change (after holding process), brake pedal pressed degree rate of change (after limiting process), brake pedal pressed degree (after clip process) and braking force command value.

In FIGS. 3A through 3H, a combination of letter A-H and number written along the vertical axis indicates a predetermined value in each graph. All operations shown in FIGS. 3A through 3H are performed while the engine is working and the vehicle is travelling. However, with or without this condition, the calculation for the brake pedal 3 is performed by the calculation unit 10. So, the engine revolutions and vehicle speed are not shown. Furthermore, each graph in FIGS. 3A through 3H indicates an intermediate process value within the calculation unit 10. These values are calculated in sequence from the top graph.

First, in the time segment before the time T1, the driver is not pressing the brake pedal 3. The brake pedal pressed amount is still at an angle of A1 [deg] that is a brake pedal release position. The angle sensor 2, based on its characteristic shown in FIG. 4A, outputs a voltage B1 [V] corresponding to the angle A1 [deg]. The calculation unit 10 A/D converts the voltage and assigns the converted value to the brake pedal signal A/D value. The brake pedal pressed degree is determined with the characteristic shown in FIG. 4B. Specifically, this characteristic defines a state in which the brake pedal 3 is not pressed at all as zero [%] and a state in which the brake pedal 3 is pressed to the maximum limit as 100 [%].

In the time segment before the time T1, the brake pedal 3 is not pressed, so the brake pedal pressed degree indicates zero [%] corresponding to the brake pedal signal A/D value of B1 [V] . Since the brake pedal pressed amount remains unchanged, the brake pedal pressed degree rate of change is zero [%/s]. Similarly, the brake pedal pressed degree rate of change (after holding process) and the brake pedal pressed degree rate of change (after limiting process) are zero [%/s] due to no change in the brake pedal pressed amount. As a result, the brake pedal pressed degree (after clip process) is zero [%] and the braking force command value is also zero [%] . The braking force command value [%] takes a value in the range of 0-100 [%], in which 0 [%] means that no braking force is applied, and 100 [%] means that full braking force is applied.

Next, at the time T1, the driver presses the brake pedal 3 a little bit from the brake pedal release position over a unit time with the brake pedal pressed amount still at an angle position of A2 [deg]. The angle sensor 2 outputs a voltage B2 [V] corresponding to the angle A2 [deg]. The calculation unit 10 A/D converts the voltage and assigns the converted value to the brake pedal signal A/D value. The brake pedal pressed degree is the percentage of A2-A1 with respect to the full stroke of the brake pedal 3, which is C1 [%]. The brake pedal pressed degree changes zero [%] to C1 [%], causing the brake pedal pressed degree rate of change to be D3 [%/s].

Since the brake pedal pressed degree does not change in the time segment from T1 to T2, the change of the brake pedal pressed degree is zero, and the brake pedal pressed degree rate of change is also zero [%/s] at the same time. The brake pedal pressed degree rate of change (after holding process), which is updated when the value of the brake pedal pressed degree rate of change is not zero, does not change and holds a value of E3 that is equal to D3 in the time segment from T1 to T2.

Figure 4A:
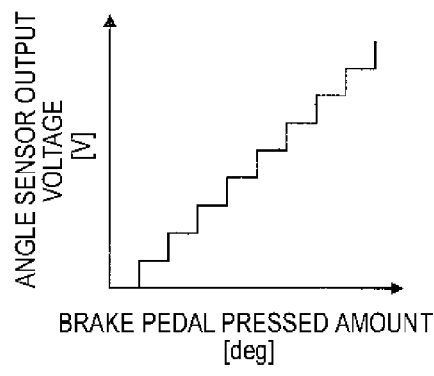
FIGS. 4A through 4D are diagrams showing values set for control of the vehicle travel device in accordance with the first embodiment of the invention.
Figure 4C:
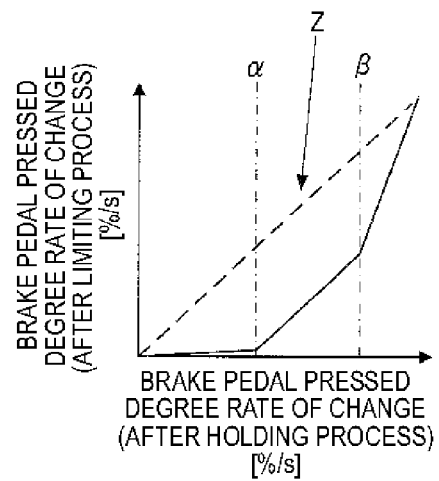

The brake pedal pressed degree rate of change (after limiting process) is determined from the characteristic shown in FIG. 4C, and, when the pressed amount is very small as seen at the time T1, the value of the brake pedal pressed degree rate of change (after limiting process) as the output is smaller than the value of the brake pedal pressed degree rate of change (after holding process) as the input, so the value of the brake pedal pressed degree rate of change (after limititng) is limited to F3 that is smaller than E3.

The brake pedal pressed degree (after clip process) is zero [%] at the time T1 and increases with the rate of change per unit time that is the brake pedal pressed degree rate of change (after limiting process). The braking force command value is determined from the characteristic shown in FIG. 4D and updated according to the brake pedal pressed degree (after clip process). Since the brake pedal pressed degree (after clip process) is on the increase from the time T1, the braking force command value increases similarly.

Next, the brake pedal pressed degree (after clip process) continuously increases to reach G1 that is equal to C1 at the time T2. The brake pedal pressed degree (after clip process), limited to the value of G1, does not change after the time T2. The braking force command value is determined from the characteristic shown in FIG. 4D and updated according to the brake pedal pressed degree (after clip process). Since the brake pedal pressed degree (after clip process) does not change after the time T2, the braking force command value also remains constant.

Next, at the time T3, the driver further presses the brake pedal 3. The brake pedal 3 is largely pressed to full braking to change the brake pedal pressed amount from A2 [deg] to A4 [deg]. The angle sensor 2 outputs a voltage B4 [V] corresponding to the angle A4 [deg]. The calculation unit 10 A/D converts the voltage and assigns the converted value to the brake pedal signal A/D value. The brake pedal pressed degree is the percentage of A4-A1 with respect to the full stroke of the brake pedal 3, which is 100 [%] because of full braking. The brake pedal pressed degree changes from C1 [%] to 100 [%], causing the brake pedal pressed degree rate of change to be D4 [%/s].

The brake pedal pressed degree rate of change (after holding process) is updated when the value of the brake pedal pressed degree rate of change is not zero, and the brake pedal pressed degree changes at the time T3, so the brake pedal pressed degree rate of change (after holding process) is E4 [%/s]. The brake pedal pressed degree rate of change (after limiting process) is determined from the characteristic shown in FIG. 4C, and, the pressed amount is very large as seen at the time T3, so the value of the brake pedal pressed degree rate of change (after limiting process) is F4 that is larger than F3.

The brake pedal pressed degree (after clip process) is G1 [%] at the time T3 and increases from G1 [%] with the rate of change per unit time that is the brake pedal pressed degree rate of change (after limiting process). The braking force command value is determined from the characteristic shown in FIG. 4D and updated according to the brake pedal pressed degree (after clip process). Since the brake pedal pressed degree (after clip process) is on the increase from the time T3, the braking force command value increases similarly.

Next, the brake pedal pressed degree (after clip process) continuously increases to reach 100 [%]. The brake pedal pressed degree (after clip process), limited to 100 [%], does not change after the time T4. The braking force command value is determined from the characteristic shown in FIG. 4D and updated according to the brake pedal pressed degree (after clip process). Since the brake pedal pressed degree (after clip process) does not change after the time T4, the braking force command value also remains constant.

Next, at the time T5, the driver eases up on the brake pedal 3. The brake pedal 3 is eased up on a little bit to change the brake pedal pressed amount from A4 [deg] to A3 [deg]. The angle sensor 2 outputs a voltage B3 [V] corresponding to the angle A3 [deg]. The calculation unit 10 A/D converts the voltage and assigns the converted value to the brake pedal signal A/D value. The brake pedal pressed degree is the percentage of A3-A1 with respect to the full stroke of the brake pedal 3, which is set to C2 [%]. The brake pedal pressed degree changes from 100 [%] to C2 [%], causing the brake pedal pressed degree rate of change to be a negative value of D2 [%/s].

The brake pedal pressed degree rate of change (after holding process) is updated when the value of the brake pedal pressed degree rate of change is not zero, and the brake pedal pressed degree changes at the time T5, so the brake pedal pressed degree rate of change (after holding process) is E2 [%/s]. The brake pedal pressed degree rate of change (after limiting process) is determined from the characteristic shown in FIG. 4C, and the value of the brake pedal pressed degree rate of change (after limiting process) is F2.

The brake pedal pressed degree (after clip process) is 100 [%] at the time T5, but is limited to G2 that is equal to the brake pedal pressed degree of A3 because the operation of easing up on the brake pedal is promptly limited by the brake pedal pressed degree. The braking force command value is determined from the characteristic shown in FIG. 4D and updated according to the brake pedal pressed degree (after clip process) to H2 [%].

Next, at the time T6, the driver further eases up on the brake pedal 3 to release the brake pedal. This causes the brake pedal pressed amount to change from A3 [%] to A1 [%]. An calculation similar to that at the time T5 is performed, then the braking force command value is set to zero [%] as an value according to the brake pedal pressed degree (after clip process).

A process of the vehicle travel control of the calculation unit 10 of the travel control device 1 is described below with reference to a characteristic diagram in FIGS. 4A through 4D.

FIG. 4A is a characteristic diagram showing the relationship between the brake pedal pressed amount and the angle sensor output voltage used in the brake pedal signal A/D process of step S201 in FIG. 2. Since the detection precision of the angle sensor 2 is coarse, the relationship of the angle sensor output voltage to the brake pedal pressed amount is not a proportional one passing through the origin. That is, according to this characteristic, no voltage is output unless the brake pedal is pressed by a predetermined amount or more, and the output voltage changes in a step-like pattern each time the pressed amount increases by a predetermined increment.

Figure 4B:
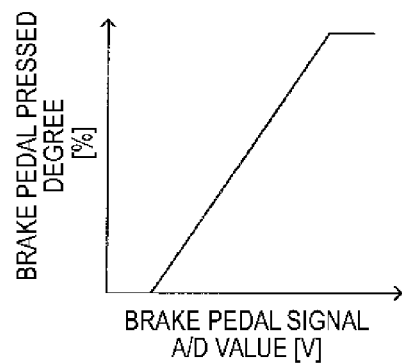

FIG. 4B is a characteristic diagram showing the relationship between the brake pedal signal A/D value and the brake pedal pressed degree used in the brake pedal pressed degree conversion process of step S202 in FIG. 2. The brake pedal pressed degree is determined from the brake pedal signal A/D value at the brake pedal release position and the full braking position, and is a value that indicates the percentage of the position corresponding to the current brake pedal signal A/D value with respect to the full stroke. So, according to this characteristic, once the brake pedal signal A/D value at the brake pedal release position is reached, the brake pedal pressed degree is on the increase, and, once the brake pedal signal A/D value at the full braking position is exceeded, the brake pedal pressed degree is 100 [%].

FIG. 4C is a characteristic diagram showing the relationship between the brake pedal pressed degree rate of change (after holding process) and the brake pedal pressed degree rate of change (after limiting process) used in the brake pedal pressed degree rate of change limiting process of step S206 in FIG. 2. The X-axis indicates the input, while the Y-axis indicates the output. The straight line Z shown by a dotted line indicates a one-to-one correspondence between the input and output. The solid line indicates actually set values. The characteristic line has a gradient lower than that of the line Z when the input value is in the range from zero to a predetermined value α; the characteristic line has the same gradient as that of the line Z when the input value is in the range from the predetermined value α to a predetermined value β; and the characteristic line has a gradient higher than that of the line Z when the input value is larger than the predetermined value β. This characteristic is one setting for solving the problem of the invention. If the gradient is higher than that of the line Z when the input value is in a predetermined range from zero, the problem is not solved. Thus, it is necessary for the characteristic, at least, to have a gradient lower than that of the line Z when the input value is in the range from zero to the predetermined value α and have a gradient in some area when the input value is larger than the predetermined value α higher than that when the input value is in the range from zero to the predetermined value α. Specifically, as shown in FIG. 5, when the input is less than 40%, the output value is smaller than the input value; and when the input is more than 40%, the output value is larger than the input value. Accordingly, a correction value calculated from this characteristic is 1.0 when the input is 40%; smaller than 1 when the input is less than 40%; and larger than 1 when the input is more than 40%.

Figure 4D:
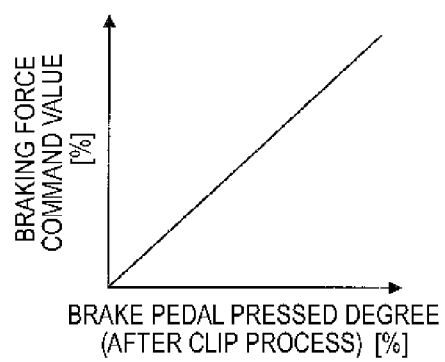

FIG. 4D is a characteristic diagram showing the relationship between the brake pedal pressed degree (after clip process) and the braking force command value used in the braking force calculating process of step S209 in FIG. 2. For simplicity's sake, in this embodiment, the brake pedal pressed degree (after clip process) and the braking force command value that are represented as 0 to 100 [%] are configured to have the same value.

The calculation by the calculation unit 10 has been described above in connection to the calculation for the brake pedal 3 and the braking device 9. However, in comparison with a calculation for an accelerator pedal and a motor output, there is no essential difference in terms of acceleration calculation except the sign of acceleration, so an accelerator pedal not shown and an output device of a motor may be used instead of the brake pedal 3 and the braking device 9.

The braking device 9 has been described as a brake. However, the braking device 9 may be any device that can apply braking to the vehicle. So, the braking may also be applied by electric generation operation or driving operation in reverse direction of a generator motor. Furthermore, the braking may also be applied by electric generation operation of a generator.

As described above, according to the vehicle travel device 100 in accordance with the first embodiment, the vehicle travel device 100 that can apply a driving or braking force according to a driver's request to a vehicle so that, even when the low-precision angle sensor 2 is used as a means for detecting the driver's request using a foot pedal, a rapid acceleration or deceleration against the driver's intention will not be detected, and the driving or braking force is not discontinuous around the transition between slow operation and rapid operation can be provided with a low-cost configuration.

Furthermore, when the rate of change of the requested acceleration obtained from the angle sensor 2 is less than a predetermined amount, the travel device 100 performs correction calculation of the rate of change of the requested acceleration with a multiplier of less than one; and when the rate of change of the requested acceleration is more than or equal to the predetermined amount, the travel device 100 performs correction calculation of the rate of change of the requested acceleration with a multiplier of one or more. This can generate the braking force command value according to the driver-requested braking force without causing rapid deceleration as if rapid braking has been requested, achieving fine control according to the pressed amount.

Furthermore, when the rate of change of the requested acceleration obtained from the angle sensor 2 has a negative value, the travel device 100 does not correct the rate of change of the requested acceleration and uses as a calculated value of the rate of change of the requested acceleration. Due to this, when the pedal is eased up on, the vehicle can be controlled with the driving or braking force responsively according to the driver-requested braking force.

Furthermore, the travel device 100 is configured to control the braking force of the braking device 9 based on the calculated requested acceleration. This can control the vehicle with the braking force according to the driver-requested braking force without causing rapid deceleration as if rapid braking has been requested.

Furthermore, the travel device 100 is configured to control the power of the motor based on the calculated requested acceleration. This can control the vehicle with the acceleration according to the driver-requested driving force without causing rapid deceleration as if rapid acceleration has been requested.

Furthermore, the braking device 9 is an electric generator installed in the power transmission path from the motor to the tire 4 and is configured to control the power generation torque of the generator based on the calculated requested acceleration. This can change the power generation torque of the generator according to the driver-requested braking force and convert the kinetic energy in braking into electric energy, which can shorten the duration in which fuel is injected for power generation, saving fuel consumption.

Furthermore, the braking device 9 is a generator motor installed in the power transmission path from the motor to the tire 4 and is configured to control the power generation torque or driving torque of the generator motor based on the calculated requested acceleration. This can control the acceleration or braking force according to the driver's request by operating the accelerator pedal or brake pedal 3 without causing rapid deceleration or acceleration as if rapid braking has been requested.

While the embodiment of the invention has been described above, according to the invention, the embodiments may be appropriately modified or omitted within the scope of the invention.

The invention claimed is:

1. A vehicle travel device comprising: a motor; a tire that rotates by the power from the motor; a braking device that can decrease the rotation speed of the tire; a sensor for detecting an acceleration requested by a driver; and a travel control device that transmits/receives a signal to/from the braking device and to/from the sensor and controls the motor or the braking device, wherein, when the rate of change of a requested acceleration obtained from the sensor is less than a predetermined amount, the travel control device performs correction calculation of the rate of change of the requested acceleration with a value less than a predetermined set value; and when the rate of change of the requested acceleration obtained from the sensor is more than or equal to the predetermined amount, the travel control device performs correction calculation of the rate of change of the requested acceleration with a value more than or equal to the set value.

2. The vehicle travel device according to claim 1, wherein, when the rate of change of the requested acceleration obtained from the sensor is less than a predetermined amount, the vehicle travel device performs correction calculation of the rate of change of the requested acceleration with a multiplier of less than one; and when the rate of change of the requested acceleration is more than or equal to the predetermined amount, the vehicle travel device performs correction calculation of the rate of change of the requested acceleration with a multiplier of one or more.

3. The vehicle travel device according to claim 1, wherein when the rate of change of the requested acceleration obtained from the sensor has a negative value, the vehicle travel device does not correct the rate of change of the requested acceleration and uses as a calculated value of the rate of change of the requested acceleration.

4. The vehicle travel device according to claim 1, wherein the vehicle travel device controls the braking force of the braking device based on the calculated requested acceleration.

5. The vehicle travel device according to claim 1, wherein the vehicle travel device controls the power of the motor based on the calculated requested acceleration.

6. The vehicle travel device according to claim 1, wherein the braking device is an electric generator installed in the power transmission path from the motor to the tire and controls the power generation torque of the generator based on the calculated requested acceleration.

7. The vehicle travel device according to claim 1, wherein the braking device is a generator motor installed in the power transmission path from the motor to the tire and controls the power generation torque or driving torque of the generator motor based on the calculated requested acceleration.

8. A vehicle travel control method comprising: a motor; a tire that rotates by the power from the motor; a braking device that can decrease the rotation speed of the tire; a sensor for detecting an acceleration requested by a driver; and a travel control device that transmits/receives a signal to/from the braking device and to/from the sensor and controls the motor and the braking device, wherein, when the rate of change of a requested acceleration obtained from the sensor is less than a predetermined amount, the travel control method performs correction calculation of the rate of change of the requested acceleration with a value less than a predetermined set value; and when the rate of change of the requested acceleration obtained from the sensor is more than or equal to the predetermined amount, the travel control method performs correction calculation of the rate of change of the requested acceleration with a value more than or equal to the set value.

* * * * *